M. R. Smith.
Sewing Machine.
No. 3,515. Reissued June 22. 1869.
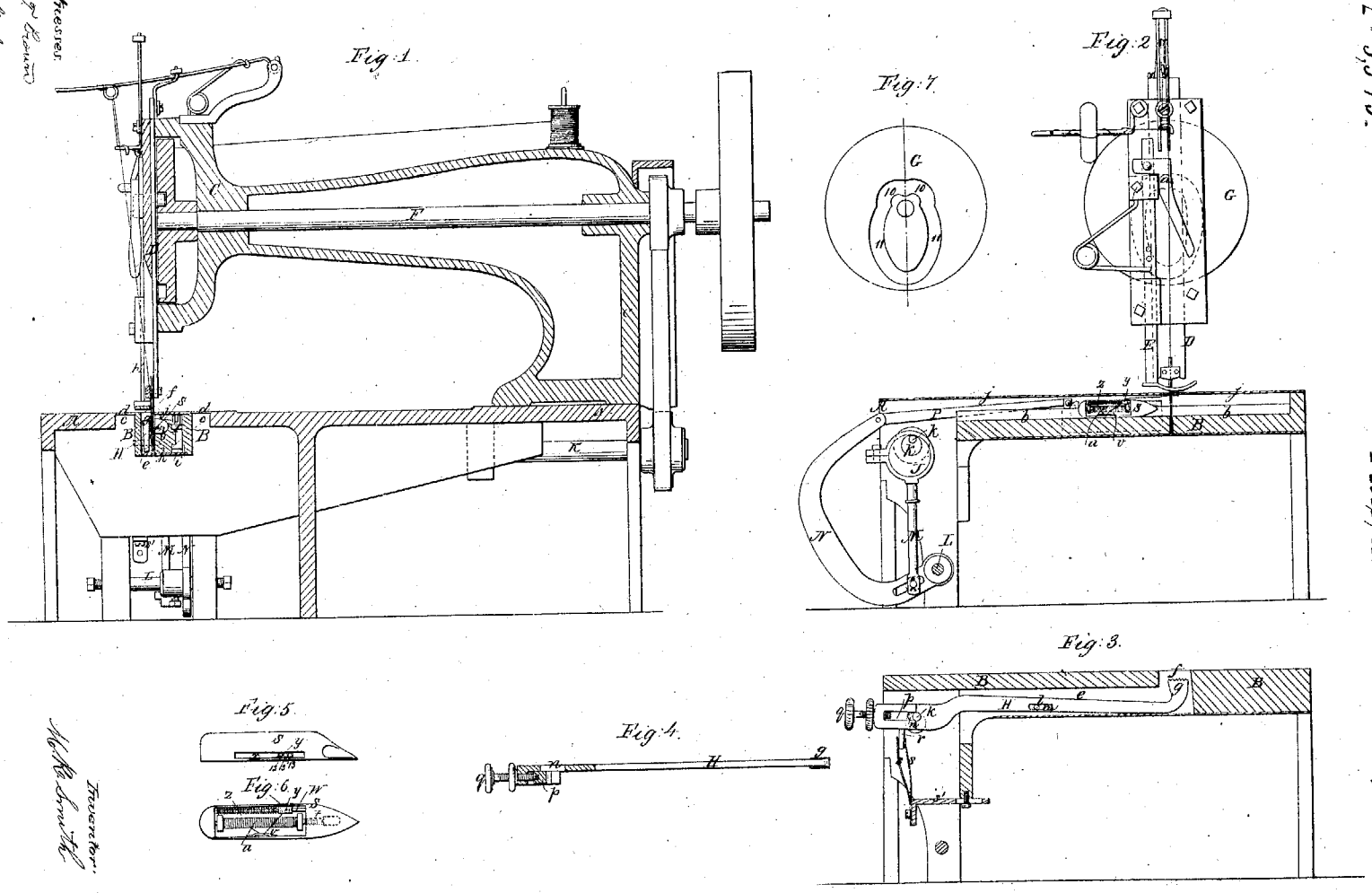
Witnesses.
Henry T. Brown
A. P. Schlegel.
Inventor.
M. R. Smith
N. PETERS, PHOTO-LITHOGRAPHER, WASHINGTON, D. C.

UNITED STATES PATENT OFFICE.

MERVIN R. SMITH, OF ARMONK, NEW YORK.

IMPROVEMENT IN SEWING-MACHINES.

Specification forming part of Letters Patent No. 37,985, dated March 24, 1863; Reissue No. 3,515, dated June 22, 1869.

*To all whom it may concern:*

Be it known that I, MERVIN R. SMITH, of Armonk, in the county of Westchester and State of New York, have invented certain new and useful Improvements in Sewing-Machines; and I do hereby declare that the following is a full, clear, and exact description of the same, reference being had to the accompanying drawings, forming part of this specification, in which—

Figures 1 and 2 are vertical sections at right angles to each other of a sewing-machine with my improvements. Fig. 3 is a vertical section of the bed plate parallel with Fig. 1, exhibiting the feed-motion. Fig. 4 is an under side view of the feed-lever, representing it partly in section. Fig. 5 is a top view of the shuttle, and Fig. 6 is a face view of the same. Fig. 7 is a face view of the needle-operating cam.

Similar letters of reference indicate corresponding parts in the several figures.

The object of one feature of my invention is to enable a sewing-machine to sew equally well whichever be the direction of the revolution of the driving-shaft or its equivalent, and to enable the direction of the feed to be reversed by simply reversing the movement of said shaft or equivalent without adjustment of any part of the machine; and to this end it consists in a novel construction of the needle-operating cam and feed mechanism and mode of combining them with the shuttle-operating mechanism, whereby the desired result is obtained.

Another feature of the invention relates to the isolation of that portion of the bed of a shuttle-machine which contains the raceway from the rest of the bed in such manner as to allow the work to pass around it as around a cylinder; and it consists in a certain mode of driving the shuttle and feed mechanism which obviates the necessity of making the isolated portion of the bed very large or of crowding the said mechanism.

Another feature consists in an improvement in the shuttle by which its thread is caused to be drawn up with more uniform tightness, and more uniform stitches are produced, and the danger of breaking the said thread is obviated, and the slack of the said thread is prevented from interfering with the needle-thread.

To enable others skilled in the art to make and use my invention, I will proceed to describe its construction and operation.

A B is the bed of the machine, having cast with or otherwise secured to it the stationary arm C, carrying the guides for the needle-bar D and presser E, and containing the bearing for the main shaft F of the machine, which is arranged horizontally at a suitable distance above the table to carry the needle-operating cam G, which operates directly upon a pin, *a*, which is secured firmly in the needle-bar.

The bed A B is constructed flat, like that of ordinary shuttle sewing-machines, except that the portion B, which contains the shuttle-raceway *b b* and the feeding device, is made somewhat deeper to give it greater strength, and that on each side of the said portion there is a slot, *c*, parallel with the raceway and extending from the front edge of the bed about three-fourths of the way across it, so far isolating the box-like part B as to leave it connected with the main portion A at the back part only and permitting cloth or other material to pass entirely around it, in the same manner as it would around a cylinder, and thereby enabling articles of tubular form—as boot-legs, coat-sleeves, &c.—to be stitched upon it in a longitudinal direction. The slots *c c* are fitted with sliding covering-plates *d d*, which are inserted when ordinary flat work is to be performed, the said plates combining with the portions A and B of the bed to give the whole bed an unbroken surface. The part B, which may be termed the "cylinder," though not, strictly speaking, of cylindrical shape, is made with a deep groove, *e*, in the bottom, on one side of the raceway, for the reception of the feed-lever H, and with a mortise, *f*, leading from the said groove right through the face of the bed, for the passage of the feeding-dog *g*, which is rigidly attached to the said lever. The said slot *e* is closed at the bottom by a sliding plate, *h*, which also closes the bottom of the slot *i* on the opposite side of the raceway in which the shuttle-driver I works. The cylinder B is made open at the top, but fitted with sliding plates *j j*, which are movable for access to the shuttle, shuttle-driver, and raceway, and the raceway and the groove *i* are both open at the rear of the cylinder to admit the shuttle and feed operating mechanism.

The shuttle-driver is operated by means of an eccentric, J, on a horizontal shaft, K, which is arranged in suitable bearings under and near the back of the bed, parallel with the main shaft F, and which is geared with the main shaft to make revolution for revolution with it, and the feed-lever H is operated by a crank-wrist, *k*, at the end of the shaft K, the said eccentric and crank-wrist being situated in the opening of the rear end of the cylinder. The eccentric J transmits motion to the shuttle-driver through a rock-shaft, L, arranged parallel with and below the shaft K, the said eccentric being connected by a rod, M, with a curved arm, N, which is fast on the said rock-shaft, and the said arm being connected with the shuttle-driver I by means of a rod, P, arranged within the cylinder, the said arm N entering the opening in the rear of the cylinder. The feed-lever works on a stationary fulcrum-pin, *l*, inserted through the groove *e*, a slot, *m*, being provided in the said lever for the fulcrum-pin, and the said slot permitting the lever to move lengthwise as well as oscillate upon the fulcrum-pin, and thus permitting the crank-wrist *k* to produce a longitudinal as well as an upward-and-downward movement of the feed-dog *g*, which thus has a movement substantially like what is common to the "four-motion feed."

To provide for varying the length of feed the bar H has an elongated hole, *n*, for the reception of the crank-wrist, and the said bar is fitted opposite to the said hole with a slide, *p*, which is adjustable by means of a screw, *q*, to cover and uncover a greater or less portion of the said slot *n*, and thereby allow a less or greater portion of lost motion to the crank-wrist in the said slot, and enabling the said pin to produce a greater or less longitudinal movement of the feed-lever and a longer or shorter feed, as may be desired, the longest feed being produced when only a sufficient portion of the slot for the reception of the crank-wrist is uncovered, and there is consequently no lost motion of the wrist, and the shortest being produced when the greatest portion of the slot is uncovered, and there is the greatest amount of lost motion, as the feed-lever, deriving its longitudinal movement in both directions from the said wrists, cannot be moved by it until the wrist has moved from one end to the other of the open part of the slot. From the bottom of the feed-lever there projects a pin, *r*, which enters between the two leaves of a light double semi-elliptical spring, *o*, secured to a suitable fixed support, *s'*. This spring is not required for producing the back movement of the feed-lever, but is only used to prevent any rattling or loose movement when there is much lost motion of the crank-wrist, and it is obvious that as the feed-lever has a positive movement in both directions, produced by the crank-wrist, it will, with a proper construction of the face of the feed-dog, feed as well in one direction as in the other.

The arrangement of the mechanism for operating the shuttle and the feed-lever, by which all parts of such mechanism, except the rod P, are brought outside of the cylinder and into a position in rear of it, where they do not interfere with the passage of the work around the cylinder, obviates the necessity of making the cylinder of so large a size that its combination with the flat bed would be inconvenient.

The needle-operating arm G is constructed in such manner that it will produce precisely the same movement of the needle-bar whichever be the direction of the needle, its groove, which receives the pin *a* on the needle-bar, being precisely the same form on both sides of the central line in red color—that is to say, commencing with a short curve, 10, in an outward direction from the center, which produces a quick movement of the needle for a short distance as it commences to rise, thence being concentric, or nearly so, for a short distance to produce a temporary suspension of the upward movement while the shuttle enters the loop of the needle-thread, and thence having a long curve, 11, to complete the upward movement of the needle.

The shuttle movement, being produced by an eccentric, and hence being a regular movement back and forth, will, if the eccentric be set to complete the stroke of the shuttle simultaneously with the stroke of the needle, keep the shuttle movement always properly timed with relation to the needle movement whichever way the needle-cam and eccentric rotate, and the longitudinal movement of the feed-dog in both directions being produced in a positive manner by the crank-wrist, which has a fixed relation to the needle-cam and shuttle-eccentric, the feed operates equally well with either direction of the main shaft F, to which the needle-cam is attached, and when it is desired to reverse the feed it is only necessary to reverse the movement of the main shaft, which may be done in any position of the parts without the danger of breaking the threads, which occurs in reversing the direction of the main shaft or driving-pulley of most sewing-machines.

It will be seen that the peculiar shape of the slot in the cam G causes the needle, when at its lowest point, to rise a short distance to form the loop through which the shuttle is to pass. Its upward movement is then arrested, and it remains, so to say, stationary, while the shuttle passes through the loop, and then it completes its upward movement.

The shuttle S has its bobbin *u* arranged substantially in the usual manner, and has friction produced upon the bobbin by means of a screw, *t*, in the inner end of which is the bearing for one of the centers or journals of the bobbin. In the lower part there is a fixed guide-bar, *v*, under which the thread passes from the bobbin, and in the upper part there is arranged lengthwise a fixed bar, *w*, to which and to a slot, *x*, in the top of the shuttle there is fitted a slide, *y*. On this bar *w* there is a spiral spring, *z*, which is so applied in relation to the slide *y* as to press the said slide toward the point of the shuttle. There are in the said slide holes 13 13, through one of which the thread passes on its way out of the shuttle. As the shuttle completes its movement through the loop the tension produced on its thread causes the slide *y* to overcome the pressure of the spring and move back toward the heel of the shuttle until the spring is compressed sufficiently to produce the requisite tension on the thread to pull it tight in the stitch. In this operation the distance between the hole in the slide *y* and the point where the thread passes under the bar *v* diminishes, and hence a considerable length of thread is drawn out of the shuttle before the drawing from the bobbin commences, and as the shuttle returns and the thread is relieved of tension the slide *y* moves forward again toward the point of the shuttle, and by increasing the distance between the hole 13 and the point where the thread passes under, the bar *v* draws back some of the slack thread into the shuttle and prevents its kinking. Another advantage of the slide *y* and spring *z* is that the shuttle-thread is drawn tight gradually or with an elastic pull, and is thereby enabled to produce a more uniform stitch and to be drawn tighter without danger of its being broken.

What I claim as my invention, and desire to secure by Letters Patent, is—

1. The combination of the cam G, having an eccentric slot, curved as shown and described, and arranged upon the needle end of the main shaft F, with the reciprocating needle-bar D, provided with a pin projecting into said slot, snbstantially as and for the purpose set forth.

2. The combination of the needle-operating cam G, constructed as described, the shuttle-driving eccentric J, and the feed-lever H, having an elongated slot, *n*, fitted with a slide, *p*, and deriving a positive motion in both directions from a crank-wrist, *k*, the whole arranged and operating, substantially as set forth, to cause the machine to operate with the driving shaft or pulley rotating in either direction, and the feed to be reversed by reversing the direction of the said shaft or pulley.

3. The combination, with each other and with the isolated portion of the flat bed constituting a cylinder or its equivalent, of the shuttle-driving eccentric J, rod H, rock-shaft L, arm N, rod P, and feed-operating crank-wrist *k*, the whole arranged and operating substantially as and for the purpose herein specified.

4. The slide *y*, guide-bar *w*, and spring *z*, combined with each other and the shuttle, substantially as and for the purpose herein specified.

In testimony that I claim the foregoing I have hereunto set my hand this 11th day of February, 1869.

M. R. SMITH.

Witnesses:
LEOPOLD EVERT,
A. N. MARR.